United States Patent [19]
Ashkin

[11] 3,808,432
[45] Apr. 30, 1974

[54] NEUTRAL PARTICLE ACCELERATOR UTILIZING RADIATION PRESSURE

[75] Inventor: Arthur Ashkin, Rumson, N.J.

[73] Assignee: Bell Telephone Laboratories, Incorporated, Murray Hill, N.J.

[22] Filed: Aug. 3, 1972

[21] Appl. No.: 277,633

Related U.S. Application Data

[63] Continuation of Ser. No. 43,516, June 4, 1970, which is a continuation-in-part of Ser. No. 885,070, Dec. 15, 1969, Pat. No. 3,710,279.

[52] U.S. Cl. .............................................. 250/251
[51] Int. Cl. .............................................. H01s 1/06
[58] Field of Search .................................... 250/41.3

[56] References Cited
UNITED STATES PATENTS

| | | | |
|---|---|---|---|
| 3,155,592 | 11/1964 | Hansen et al. | 176/1 |
| 3,152,959 | 10/1964 | Damm | 176/5 |
| 3,360,733 | 12/1967 | Vali et al. | 328/233 |
| 3,489,645 | 1/1970 | Daiber et al. | 176/1 |
| 3,532,879 | 10/1970 | Braunstein et al. | 250/41.9 |
| 3,558,877 | 1/1971 | Pressman | 250/41.9 |

FOREIGN PATENTS OR APPLICATIONS

1,153,599   5/1969   Great Britain ......................... 176/1

Primary Examiner—James W. Lawrence
Assistant Examiner—B. C. Anderson
Attorney, Agent, or Firm—W. L. Wisner

[57] ABSTRACT

There are disclosed apparatuses for generating plasmas at thermonuclear temperatures by employing radiation pressure to accelerate suitable reactant particles to a relative velocity at which their mutual collision can generate the required temperature of the nuclei within the time that one particle passes through the other. The orbital electrons and the nuclei will be heated essentially equally rapidly, so that, even with a relatively simple magnetic confinement field, electronic instabilities prior to thermonuclear fusion may be avoided.

5 Claims, 8 Drawing Figures

NEUTRAL PARTICLE ACCELERATOR UTILIZING RADIATION PRESSURE

CROSS-REFERENCE TO RELATED APPLICATION

This is a continuation, of application Ser. No. 43,516 filed June 4, 1970, which is a continuation-in-part of my copending patent application Ser. No. 885,070 filed Dec. 15, 1969, now U.S. Pat. No. 3,710,279 and assigned to the assignee hereof.

BACKGROUND OF THE INVENTION

This invention relates to the controlled use of the effects of radiation pressure upon neutral particles and, particularly, to the acceleration of such particles by such means to generate hot plasmas.

Historically, radiation pressure is a physical effect that has been occasionally studied in the laboratory but has been consistently considered to be of no practical interest because of the obscuring effects of thermal forces.

While it has been postulated by A. V. Kats et al., *JETP Letters*, Vol. 9, page 192 (1969), that radiation pressure can deform so-called free surfaces of a liquid in opposition to surface-tension forces or scan an interferometer, as disclosed by Yu. F. Ogrin, *JETP Letters*, Vol. 10, page 304, Nov. 20, 1969, no practical use of radiation pressure with neutral particles free to move with respect to their environment has been envisioned.

Heretofore, many techniques, such as synchrotron techniques, have been known for trapping and accelerating charged particles; but no really effective techniques are known for producing similar velocities with neutral particles. The latter fact is shown by the article by E. R. Harrison, *Physical Review Letters*, 11, 535 (1963).

My invention, to be described hereinafter, is directed to the acceleration of neutral particles to final velocities of the order of $6 \times 10^7$ centimeters per second and to the generation of thermonuclear plasmas, or other hot plasmas, by accelerated neutral particles.

Existing methods of employing laser radiation to generate thermonuclear plasmas are primarily based on the ionization and heating of solid targets by direct absorption of high power, short wavelength laser light. While some use of radiation pressure has been suggested in this context as a technique for confining the rapidly expanding plasma, no practical technique for providing controlled nuclear fusion has yet been proposed.

The source of the problem in generating and utilizing hot plasmas for such purposes is, in part, the fact that all the heating must take place at relatively high plasma densities (about $n \geq 10^{21}$ electrons per cubic centimeter) since at lower densities the plasma becomes quite transparent, As a consequence, the heating must be accomplished in times considerably less than a nanosecond.

Further, the electrons are heated much faster than the ions, the positively charged nuclei. Although the resulting collective electron instabilities observed in experiments have never been fully explained, the lag in the rise of the ion temperature may be a significant factor.

SUMMARY OF THE INVENTION

I have discovered that small particles, molecules and atoms free to move with respect to their environment, can be trapped in stable optical potential wells and controllably accelerated using the forces of radiation pressure from sources of beams of optical radiation having selected frequency, shape and intensity. My discovery includes the first observation of the acceleration of such particles by the forces of radiation pressure from visible laser light. The experiments, performed on micron-size particles in liquids and gas, have yielded new insights into the nature of the radiation pressure force and have led to the discovery of stable optical potential wells in which such particles were trapped by radiation pressure alone. The broader aspects of this invention are covered in my above-cited copending patent application.

According to the species of my invention to which my present application is directed, neutral particles are accelerated to final velocities of the order of $6 \times 10^7$ centimeters per second in multi-stage apparatuses. As one example of utility, hot plasmas, illustratively at thermonuclear temperatures, are generated by employing radiation pressure to accelerate a transparent neutral reactant particle in such a multi-stage apparatus to strike a target with sufficient relative velocity to obtain the desired temperature. The principal advantage of the plasma formation according to my invention is that orbital electrons and the constituents of the nuclei will be heated equally rapidly, so that collective electron instabilities prior to the desired reaction may be avoided. As another specific example of utility, as set out in the first-filed cross-referenced parent patent application, such acceleration of particles can be made to simulate the effects of micro-meteoroids in outer space and micrometeorites which fall to earth, to induce high-energy chemical interactions or to generate certain types of useful signals, including an output of light shifted upwards in frequency, for example.

A further advantage of this species of my invention resides in the simplicity with which the plasma may be effectively confined by a magnetic field.

According to another feature of my present invention, the net yield of a controlled fusion reaction for the purpose of power generation is increased by using a multistage acceleration apparatus employing guides for the accelerating light and apertured reflectors through which the particle passes, the reflectors being oriented to enable the use of many accelerating lasers.

Also, a large number of particles may be accelerated simultaneously.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENT

Theoretical and Experimental Basis of the Invention

Much of the theoretical and experimental background set forth in my above cited copending patent application is equally applicable as background for the adequate understanding of the species claimed in the present application. Thus, I shall first explain my earlier experiments employing particle acceleration by radiation pressure.

One of my typical experiments uses transparent polystyrene spheres of 0.585 micron and 1.31 micron diameter and polyvinyltoluene spheres of 2.68 micron diameter in pure water in a suitable cell having glass walls 120 microns thick. A TEM$_{co}$ mode beam of an argon ion laser of radius $w_o = 6.2$ microns and a wavelength $\lambda = 0.5145$ micron was focused horizontally through one of the walls into the cell. The results were observed by eye through a microscope and an eye-protecting filter. The beam was manipulated to strike single particles. When a beam of milliwatts of power hit a 2.68 micron particle off center, the particle was simultaneously drawn in toward the beam axis and accelerated in the direction of the light beam with a terminal velocity of microns per second until it hit a wall of the glass cell, where it then remained trapped in the beam. If the beam was then blocked, the particle wandered away from the trapping site by Brownian motion. Similar effects occurred with the smaller particle sizes but required more power for the same velocity.

The differences in the accelerations of the different-size transparent particles were dramatically illustrated when they are mixed throughout the water solution and then the beam was directed to strike many of them upon its passage through the cell. The beam then preferentially accelerated 2.68 micron particles and tended to leave the 0.585 particles behind. This experiment illustrates the separation of particles based on optical cross section and differs from the ultracentrifuge in that its force falls more slowly with particle size. It also illustrates that radiation pressure and not convection is the driving mechanism, since convection could not separate the particles in this manner.

Figure 4:
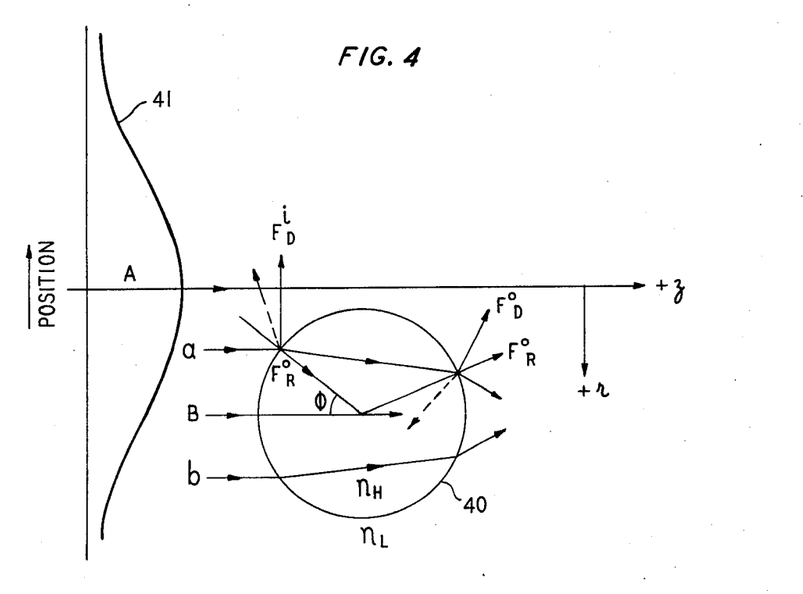
FIG. 4 shows an explanatory force diagram for a typical transparent neutral particle accelerated according to the technique of the invention.

The particle velocities and the trapping of the particles on the beam axis can be accounted for in detail with reference to the force diagram of FIG. 4. Let us assume that the index $n_H$ of the spherical particle 40 is 1.58. The curve 41 at the left-hand side of FIG. 4 illustrates the intensity of the light beam propagating along the axis A for various cross-sectional positions within the beam indicated in the vertical direction. It will be seen that the spherical particle 40 is situated off the beam axis in water of index $n_L = 1.33$.

Consider the stronger ray $a$ of a typical pair of rays, $a$ and $b$, symmetrically situated about the center of this sphere. The ray $a$ undergoes Fresnel reflection and also refraction (called a deflection here) at both the input and output surfaces of particle 40 along its propagation path. The reflections give rise to radiation pressure forces $F_R{}^i$ and $F_R{}^o$ (the input and output reflection forces). It will be noted that each of these reflection forces bisects the exterior obtuse angle between the incident and reflected components at the respective one of the surfaces. The deflections further give rise to radiation pressure forces $F_D{}^i$, $F_D{}^o$ (the input and output deflection forces). It will be noted that each of these deflection forces bisects the exterior obtuse angle between the incident and deflected components at the respective one of the surfaces, as shown. Let us adopt cylindrical coordinates such that the direction of the beam is the $+z$ direction and the transverse coordinate is $r$, radially out from the beam axis A. Although the magnitudes of the forces due to ray $a$ vary considerably with the angle $\Phi$ (the angle between the incident direction of propagation and the sphere radius to the point of incidence), qualitatively, the results are alike for all $\Phi$. The transverse (in the coordinate $r$) components of $F_D{}^i$ and $F_D{}^o$ are much larger than $R_F{}^i$ and $F_R{}^o$. In fact, they are about 10 times larger for $\Phi = 25°$. All of these forces contribute to acceleration in the direction of propagation of the beam. $F_R{}^i$ and $F_R{}^o$ have transverse components which approximately cancel, to the first order: $F_D{}^i$ and $F_D{}^o$ add in the transverse direction and are in the transverse direction toward the center of the beam, that is, toward $-r$; and the net transverse force due to say $a$ is in the $-r$ direction. By an analogous argument, the symmetrical weaker ray $b$ gives a net force along the $+z$ direction of propagation of the beam and a net outward but weaker transverse force. Thus, this spherical particle 40 as a whole is accelerated inward and forward, as observed. Thus, we see that, when $n_H$ is larger than the index $n_L$ of the surrounding medium, the net transverse (radial) force for the stronger ray is inward toward higher light intensity.

The radiation-pressure force in general is given by $$F_{rad} = 2qP/c, \qquad (1)$$

where $P$ is the particle, $c$ is the velocity of light, and $q$ is the fraction of light effectively reflected back from the particle.

To compute the $z$ component of the radiation-pressure force when the particle 40 is on the axis of the beam, on integrates the incremental $z$ forces of the plane polarized beam over the surface of the sphere. This integration yields a force for which the $q$ in Equation (1) is equal to 0.062, in a typical experimental case. From this force we can derive the limiting velocity $v$, in a medium of viscosity $\eta$ by Strokes' law:

$$v = 2qPr/3c\pi w_o{}^2 \eta \qquad (2)$$

where $w_o$ is the radius of the waist of the beam.

For 19 milliwatts of power in the laser beam and a spherical particle 40 of radius 1.34 microns in water, for which $\eta$ is $1 \times 10^{-2}$ poises, I compute $v = 29$ $\mu$/sec, whereas I measured $26 \pm 5\mu$/sec. These results show good agreement.

In the foregoing experiment, the spherical particle 40 acts as a focusing lens. A simiar analysis shows that if the relative magnitudes of the indices of the media are reversed, the spherical particle becomes a diverging lens, the signs of the radial deflection forces reverse, and the spherical particle is pushed outward from the center of the beam. This prediction was checked experimentally in the extreme case of a low-index spherical particle in a high-index medium, namely, an air bubble in a high-index liquid. Bubbles, about eight microns in diameter, were generated by shaking a high viscosity medium consisting of an 80 percent by weight mixture of glycerol in water. It was found that the bubbles were always pushed out of the light beam as they were accelerated along, as expected. In the same mixed medium having an index $n_L = 1.44$, the 2.68 micron spherical particles of index $n_H = 1.58$ still behaved in a focusing manner and were drawn inward toward the axis of the beam as they were accelerated along.

A further basic experiment involving 2.68 micron spherical particles in water in a glass-walled cell demonstrated trapping of substantially transparent particles with just two opposing beams which were shaped by lenses positioned to form the beam waists well before the trapping region, so that the beams were strongly divergent. The two beams were aligned to be approximately collinear. Particles that drifted near either beam were drawn in, accelerated to the region of substantially equal and opposite radiation pressures, were then decelerated by the counter-acceleration of the opposing beam, and eventually brought to rest by viscous damping in the region of nearly equal radiation pressures, which was a region of stable equilibrium. The stability of a particular particle in this region was checked by interrupting one beam and allowing the particle to accelerate rapidly in the remaining beam. When the opposing beam was again turned on, the particle returned to the equilibrium region more clowly than it left it in a single beam, since it was acted on only by the differential radiation-pressure force. Interrupting the other beam reversed the behavior of the particle. These particles are damped by viscous forces and have a limiting velocity in the water depending on the magnitude of the force.

In other experiments, roughly 2.5-micron-radius water droplets from an atomizer were accelerated with a single argon-ion laser beam at a power lever of 50 milliwatts; and velocities of about 0.25 cm/sec were observed. Such motions could be seen with the naked eye. The behavior of the water droplets was in qualitative agreement with theoretical calculations.

In these experiments it is clear that I have discriminated against radiometric forces, particularly photophoresis. These forces push more strongly on hot surfaces than on cooler surfaces and would push high-index spherical particles and bubbles out of the beam, contrary to my experimental observation that the high-index spherical particles were drawn into the beam. Even the observed direction of acceleration along the beam axis is the opposite of the radiometric prediction. According to the principles of radiometric effects, a moderately-focusing sphere concentrates more heat on the downstream side (with respect to light propagation) of the spherical particle. The particle should therefore move upstream into the light (negative photophoresis). From similar theoretical considerations and calculations for water droplets in air I have confirmed that photophoresis could account for the observed results only if temperature gradients existed across each water droplet which can, in fact, not be sustained. Thus, the particles are accelerated by radiation pressure.

Figure 1:
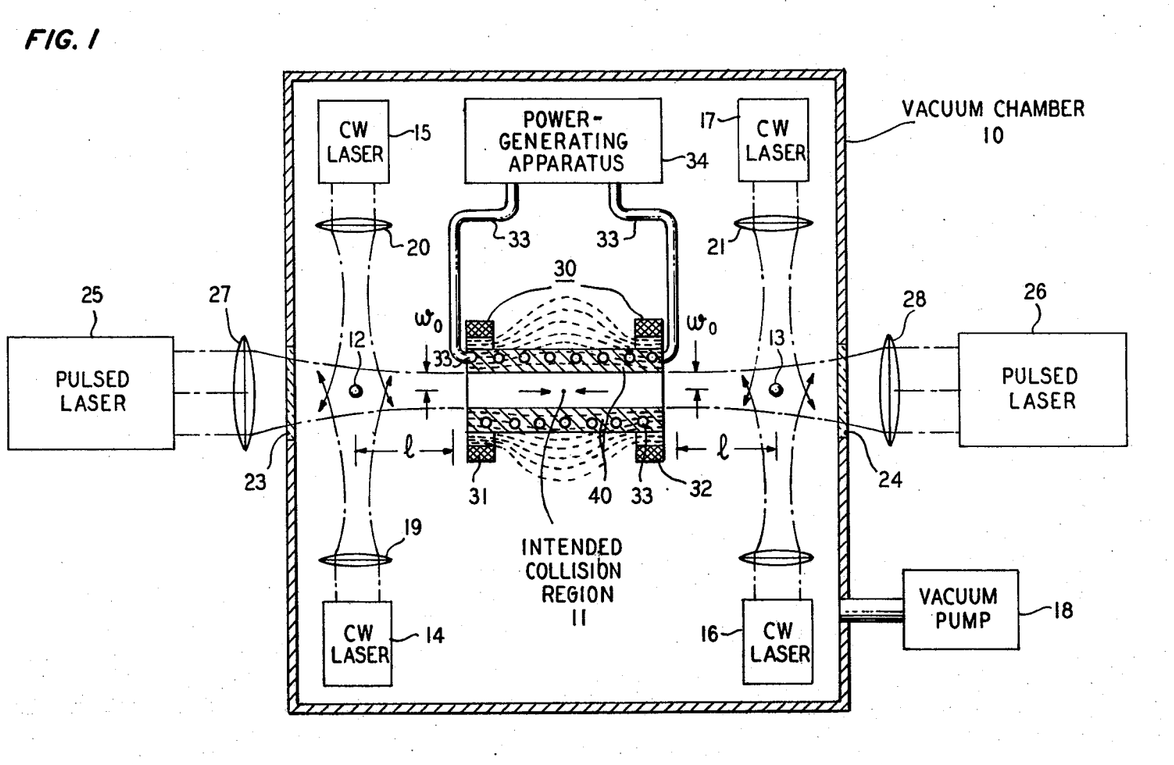
FIG. 1 is a partially pictorial and partially block diagrammatic illustration of an illustrative embodiment of the invention.

The Plasma Generator of FIG. 1

In the embodiment of FIG. 1, it is proposed to obtain a hot plasma, illustratively at thermonuclear temperatures, in an intended collision region 11 into which the transparent reactant particles 12 and 13 are accelerated from opposite directions. Specifically, the particles 12 and 13 are illustratively respectively lithium deuteride and lithium tritide particles which are to be accelerated to velocities between $10^7$ and $10^8$ centimeters per second without melting prior to colliding with each other or with a suitable target in region 11.

As explained in my above cited copending patent application, to prepare the particles 12 and 13 for acceleration, it is necessary to introduce them into a vacuum chamber 10, which in the first instance has a viscous damping atmosphere of a gas such as argon or nitrogen, so that they may be stably trapped in the confluence regions of the beams from lasers 14 and 15, for particle 12, and lasers 16 and 17, for particle 13. The viscous damping atmosphere is then pumped out by the vacuum pump 18. Appropriate shaping of the trapping laser beams is provided by lenses 19, 20, 21 and 22. In order that the high power accelerating laser beams can be admitted, the vacuum chamber 14 includes the transparent windows 23 and 24 in alignment between trapped particles 12 and 13, respectively, and the respective pulsed laser sources 25 and 26. The beams from lasers 25 and 26 are shaped by lenses 27 and 28 to exert their greatest accelerating forces in the region extending from the respective particles 12 and 13 to a distance just short of the intended collision region 11.

The intended collision region 11 is surrounded by a magnetic mirror device 30 including magnetic mirrors such as the coils 31 and 32 spaced apart to produce a substantially fringing field between them and with a common axis extending along the intended flight paths of particles 12 and 13. Usable examples of such magnetic confinement techniques are described in Spitzer, *Physics of Fully Ionized Gases*, Second Revised Edition, (New York) Interscience (1962), e.g., pages 116–118.

The magnetic mirror device 30 is surrounded by a suitable utilization means, such as the thermodynamic generating apparatus including the heat-transfer coil 33 within the $Li^6$ blanket or thermal absorber 40 and the associated turbine or other power generating apparatus 34. Part of the electrical power derived from apparatus 34 will be used to pump lasers 14 through 17, 25 and 26.

The spheres 12 and 13 of lithium deuteride and lithium tritide illustratively have a diameter, $2r$, equal to 0.44 micrometers and a density, $d$, of 0.82 grams per cubic centimeter. Other illustrative parameters for the embodiment of FIG. 1 will be developed hereinafter in connection with a particular example.

Broadly, the operation of the present invention may be described as follows. First, the acceleration of the particles 12 and 13 from their trapping regions toward the intended collision region 11 has been described in broad terms above in connection with the theoretical and experimental background of the invention. Second, the collision of particles 12 and 13 results in a hot plasma, the temperature of which is determined primarily by the final kinetic energy of the accelerated particles. Furthermore, and quite significantly, the positive ions and electrons thus formed are automatically thermalized in about the time required for one particle to pass through the other (about $10^{-12}$ seconds). Such a plasma must be contained, as by the magnetic mirror 30, or some comparable confinement technique as is previous nuclear fusion work. But, due to its complete thermalization, greater stability will apparently be obtained inherently. It can also be demonstrated that this technique, employing acceleration by radiation pressure, does not require particularly short laser pulses.

Moreover, despite the relatively inefficient use of the laser light iself, my calculations show that a net yield of energy from the apparatus is feasible.

We now calculate the final velocity $v$ (cm/sec) which can be achieved by accelerating a neutral spherical particle of radius $r$ (cm) and of low optical loss $L$(cm$^{-1}$) to the point when the temperature rise is $T$(°K). Assuming that the power $P$ (erges/sec) hitting the particle of density $d$(gm/cm$^3$) to be constant during the pulse of length $\tau$ (sec), the relation of the force due to radiation pressure and the acceleration $A$ is:

$$F_{rad} = 2qP/c = (4/3)\pi r^3 dA \qquad (3)$$

where $q$ is the fraction of $P$ effectively reflected back from the sphere. We also relate the temperature rise $T$(°K) to the specific heat of the particle $s$(ergs/gm°K) and the energy absorbed in time $\tau$:

$$(4/3)\pi r^3 dTs = P\tau brL \qquad (4)$$

where $b$ is a constant between 1 and 2 which represents the effective thickness of a sphere for transmitted light making a single pass through the sphere (use $b = 1.5$). For constant acceleration, the final velocity $v = A\tau$.

From Equations (3) and (4) we have:

$$V = 2qsT/rcbL \qquad (5)$$

Example

Consider a numerical example of the basic relation in Equation (5). Let $T - 10^{3}$ °K (the melting point of LiD), $s = 4.1 \times 10^7$ ergs/bm°K (for $LiD$), and $L = 2 \times 10^{-4}$ cm$^{-1}$ (the value for crystal quartz or a good optical glass). For large transparent particles of a given index of refraction $n$ (i.e., $r \gg \lambda$), the value of $q$ is independent of $r$. For particles where $r \lesssim \lambda$, $q$ varies considerably with $r$ and, indeed, as P. Debye has shown, *Annalen der Physik*, 30, 57 (1909), it can be resonant for particular values of $r$. For $2r = 0.44$ micrometers, we are in the regime of $r \lesssim \lambda$. Therefore, we refer to FIG. 7 of Debye, in selecting the magnitude of $q$ for any particular $r$ and index of refraction. Assuming $n = 1.5$, we select $\rho = 2$ in Debye's notation, which corresponds to $2r = \rho\lambda/\pi = 0.44\mu$ for $\lambda = 0.69\mu$; also Debye's $M(L)/W = 0.70$ corresponds to our $q = 0.35$. This value of $q$ is only slightly resonant (the asymptotic value of $q$ for $r \gg \lambda$ is 0.15). Resonance implies that the incident light effectively make more than a single pass through the particle. In this case we use an effective value of $b$ in the above equation given by $b = b$ (single pass) $(q_{res}/q$ asumptotic$) = (1.5)(0.35/0.15) = 3.5$. Substituting the assumed quantities in Equation (5) we calculate $v = 6.2 \times 10^7$ cm/sec. This corresponds to ~4 Kev per deuteron assuming we have some fraction of deuterium in particle 12.

Up to this point the pulsewidth $\tau$ has been left unspecified. By manipulating Equations (4) and (5) one can show that:

$$F/\pi r^2 = (2rdvc/3q)(1/\tau) \qquad (6)$$

Thus, the value of $\tau$ determines the power density required to drive the particle. Since we assumed essentially uniform acceleration, the value of $\tau$ fixed the length $l$ of the interaction region (i.e., $l = (v/2)\tau$). Taking $l$ to be the near field distance of the pulsed laser we have $l = 2\pi w_o^2/\tau$ from which we derive $w_o$. For a Gaussian beam the power hitting the small sphere of radius $r$ is related to the total power $P_{total}$ by, $p = P_{total}(2r^2/w_o^2)$, from which we can extract the value of $P_{total}$. Finally, the total energy in the accelerating pulse is $P_{total} \tau$. That is:

$$P_{total}\tau = P\tau(w_o^2/2r^2) \qquad (7)$$

If we take $\tau = 2 \times 10^{-7}$ sec and $d = 0.82$ gm/cm$^3$ (for LiD), then $P/\pi r^2 = 3.2 \times 10^{13}$ watts/cm$^2$, $l = 6.2$ cm, $w_o^2 = 6.9 \times 10^{-5}$ for $\lambda = 0.69\mu$, $P_{total} = 3.5 \times 3.5 \times 10^9$ watts and the total energy = 685 Joules. $Nd$ glass lasers with this sort of performance are within the state of the art.

The radiation pressure on the surfaces of the accelerated sphere is ~$10^{10}$ dynes/cm$^2$. Statically this should have rise to a strain which is closely within the elastic limit of the material. If strong shock waves are set up in the sphere due to the rapid onset of the light pulse, one could shatter the sphere. It should be possible to avoid this by shaping the leading edge of the accelerating light pulse as was done by John F. Asmus, *IEEE Journal of Quantum Electronics*, QE6, 265, (1967), in his experiment in laser acceleration of small metal particles by ablation. If, however, the power density driving the particle is high enough to give nonlinear absorption, one has no alternative but to reduce it. The power density at which nonlinear effects occurs in small dielectric samples is somewhat uncertain since data from bulk dielectrics are not necessarily relevant. For example, stimulated Brillouin scattering may be much inhibited with small samples. The fact that particle 13 is lithium tritide instead of lithium deuteride also increases the potential yield of the interaction and decreases the required laser power.

Improvements in performance are possible with particles of higher index of refraction and a more resonant situation, other things being equal. More effective acceleration results. Also, lower absorption losses are conceivable, possibly by as much as a factor of 20. This would result in a corresponding increase in the final velocity attainable, as seen from Equation (5).

The efficiency of acceleration by radiation pressure is low enough to make such improvements desirable, as shown by the following easily-derived formula for the ratio of the potential thermonuclear yield to the total laser energy striking the particle during acceleration (assuming this is lost):

$$\text{Energy Out/Energy In} = [2qfy(1.6 \times 10^{-12})]/[(m_{deut} + m_{trit})cv] \qquad (8)$$

where $f$ is the fraction of the mass of the accelerated particle that is hydrogen, $Y$ is the thermonuclear yield in $ev$, $m_{deut}$ and $m_{trit}$ are the masses of the deuteron and triton (considering the $d = t$ reaction). For $f = 1$, $q = 1$ this ratio is 3.8 for $v = 6.2 \times 10^7$ cm/sec, and $Y = 17.6$ Mev. This is not a great deal larger than unity. Furthermore, this formula neglects the laser efficiency and assumes complete use of the fusion energy so that an "ideal" ratio results.

The nuclear fusion produced in collision region 11 by the collision of the lithium dueteride particle 12 and lithium tritide particle 13 produces a variety of high energy particles and high energy radiations. The radiations are partially intercepted directly by the thermal blanket 40, which is rich in $Li^6$, the coil 33 and the fluid therein which is is the heat transfer medium. The high energy particles are contained by the magnetic mirror 30 until they decay into high energy radiations, or collide with $Li^6$ blanket 40 producing heat and tritium as a by-product, or until the density of the contained particles becomes so great that some of them leak out of the magnetic confinement field of magnetic mirror 30.

After the extended period of use, blanket 40 is removed; and the tritium is extracted and made into new lithium tritide particles 13.

Let us assume that the heat transfer fluid in coil 33 is a suitable liquid. High energy flux bombarding it will heat the blanket, which transfers heat to the liquid and heats it. The heated liquid will be conducted by tube 33 to the power generating apparatus 34, where it illustratively drives a conventional electrical generating set, that is, a set comprised of turbine and an electrical generator driven by the turbine.

Alternative energy conversion schemes are available for extracting some of the energy of the high energy particles produced in the nuclear fusion. As a further example, the high energy particles could be allowed to leak out of the magnetic confinement field at a controlled rate in a controlled direction. Not only is this convenient for extracting energy from the particles by some techniques, but it also can provide an unbalanced thrust which is useful for propulsion. A varieity of ion propulsion engines could be powered by this technique.

It should be noted that the laser radiation used for accelerating the particles in the embodiment of FIG. 1 are preferably visible wavelength or infrared wavelength lasers. But, in the broadest sense, they could be intense sources of electromagnetic radiation anywhere in the optical portion of the spectrum, which I define to extend from about 1,000 micrometers (1millimeter) to about one-tenth micrometers.

It should also be apparent that the relatively simple embodiment of FIG. 1 may be broadly useful for generating highly ionized plasmas which have overall charge neutrality. Such plasmas have other uses than merely the production of nuclear fusion. The generation of such plasmas is of great interest for use in various types of laboratory experiments. The term "plasma" as used herein means a gas in which at least some charged particles have relatively high mobility with respect to one another and other constituents of the gas and in which there are nearly equal numbers of positive and negative charged particles yielding substantial charge neutrality over the mass as a whole.

The prospects for a useful thermonuclear net yield from the apparatus of my invention can be substantially improved by reducing $p/\pi r^2$, the power density driving the sphere, by a large factor. From Equation (6) above, one sees that, apart from reducing $v$, one can only increase $\tau$. With the simple confocal geometry descibed above, increasing $\tau$ increases the total energy needed since $w_o^2$ also increases. Nevertheless, if we resort to breaking the acceleration process into many synchronized stages, one can not only increase $\tau$ by a large factor, but also reduce the total energy needed considerably.

Figure 2A:
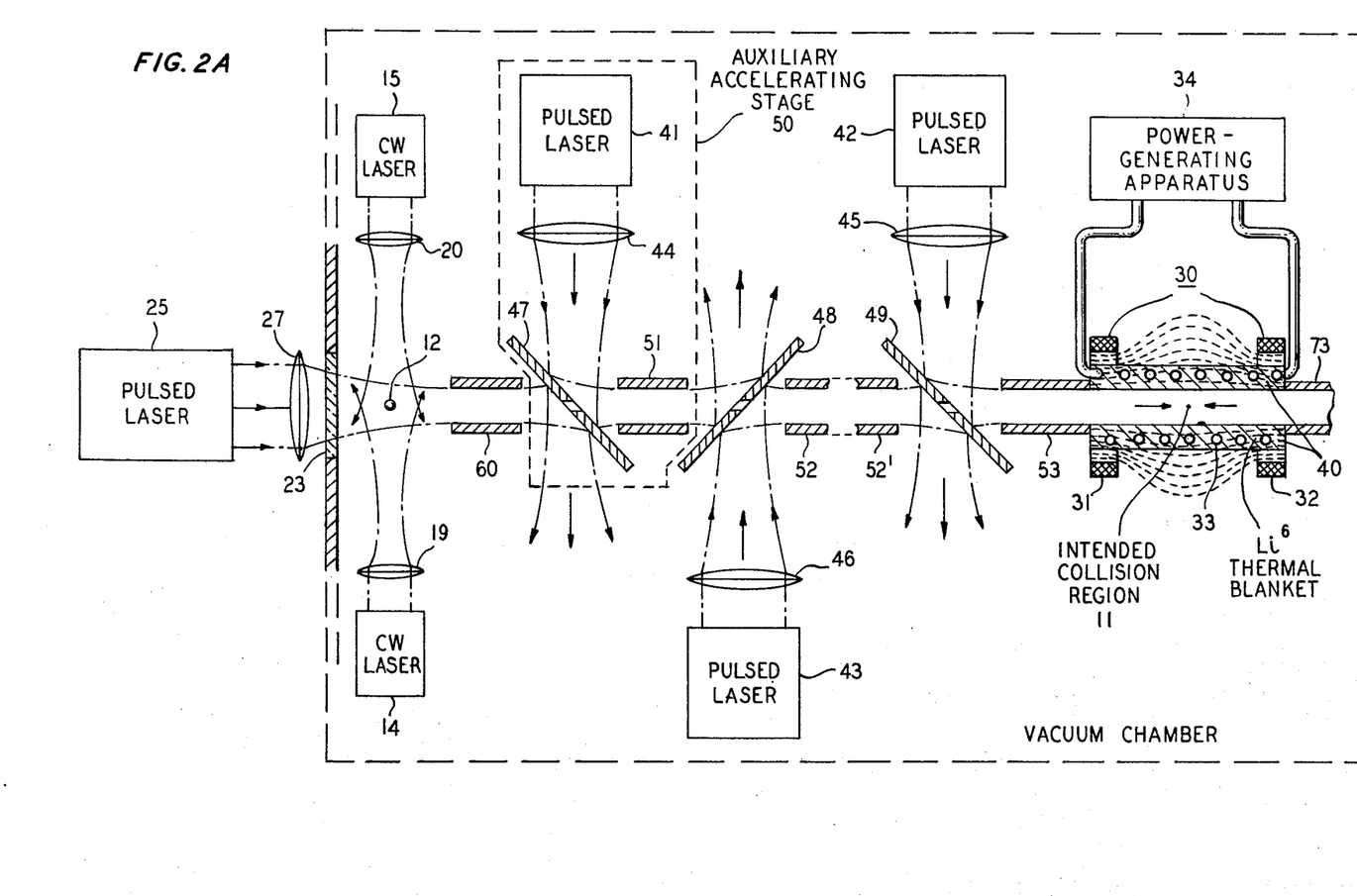
FIGS. 2A and 2B, respectively, show portions of a partially pictorial and partially block diagrammatic illustration of a second, multi-stage embodiment of my invention.
Figure 2B:
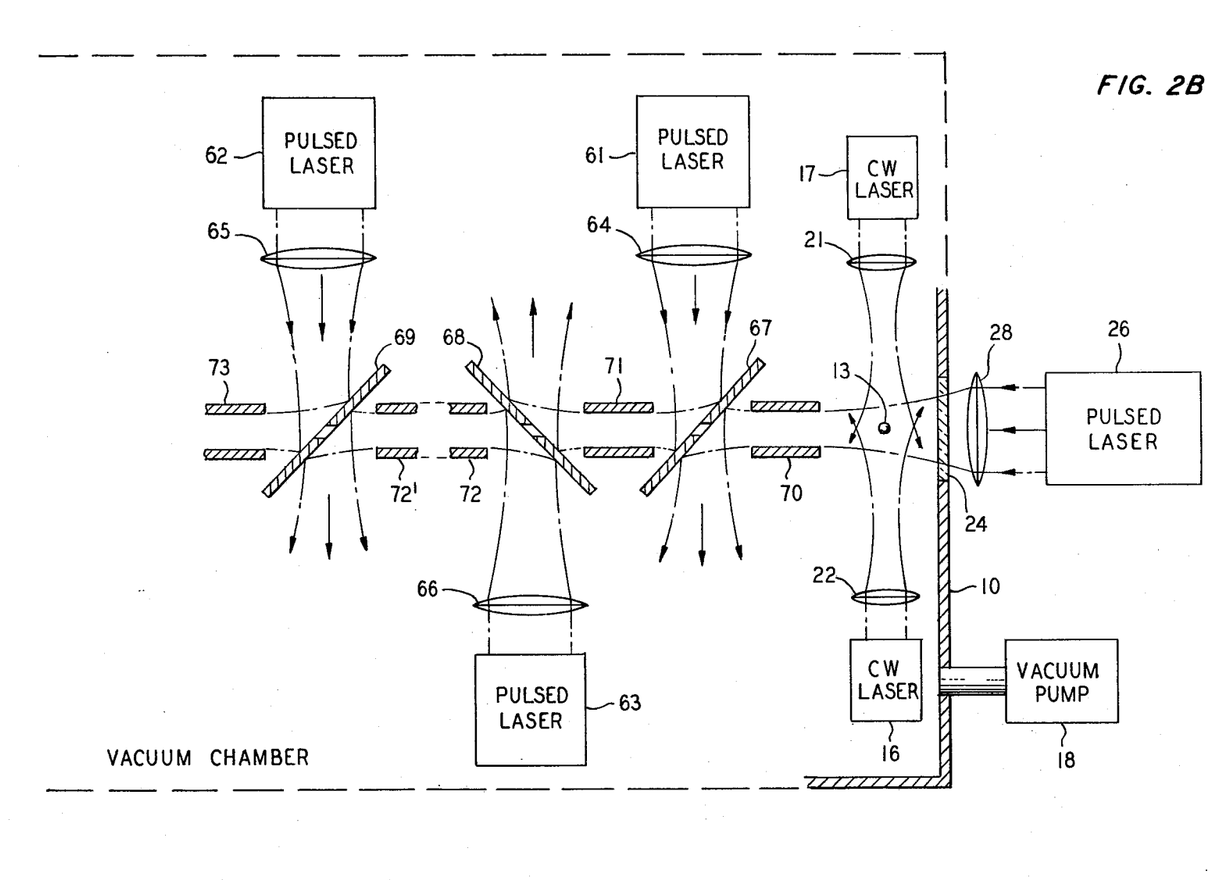
Figure 3:
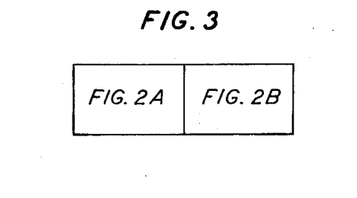
FIG. 3 shows the relationship of FIGS. 2A and 2B.

An example of one such mulistage scheme is shown in FIGS. 2A and 2B, which are related as shown in FIG. 3.

The Plasma Generator of FIGS. 2A and 2B

The embodiment of FIGS. 2A and 2B employs some of the same components as in the embodiment of FIG. 1; and those components are numbered the same and function the same as in FIG. 1. In addition, there are included between the stable trapping regions of particles 12 and 13 several auxiliary accelerating stages such as stage 50 adapted to accelerate the particles toward their mutual collision.

Each of the auxiliary accelerating stages respectively includes one of the pulses lasers 41, 42, 43, 61, 62, 63, and one of the focusing lenses 44, 45, 46, 64, 65, 66, which direct the beam upon the corresponding oblique reflector 47, 48, 49, 67, 68, 69, each of which has a central aperture centered on the intended path of its respective particles to be accelerated. Further, each of the auxiliary accelerating stages can be considered to include one of the periodic guide sections 51, 52, 53, 71, 72, 73, which renders the axially directed light more effective for acceleration by inhibiting its natural spread according to the laws of diffraction.

By analogy, eachof the primary accelerating stages, otherwise similar to those shown in FIG. 1, can also include a guide section 60 or 70 beyond particle 12 or 13, respectively. In either half of the acceleration apparatus, a guide section 52 or 72, respectively, is shown broken and followed by a possibly different section 52' or 72', to signify that a desired multiplicity of additional auxiliary accelerating stages could be inserted therebetween.

Each of the oblique apertured reflectors 47, 48, 49, 67, 68, 69 serves to receive a pulsed laser beam from a direction other than the flight path of the particle and to direct its respective received beam along that path to provide an accumulative acceleration for the particle. Thus, the accelerated particle continuously gains energy. I shall neglect the portion of the pulsed laser beams which is lost through the aperture of its respective reflector and concentrate on that portion directed into the desired direction.

Thus, each stage illustratively consists of a pulsed, synchronized ruby laser, e.g., 41, firing into a hollow, smooth walled, dielectric tube, e.g., 51, which acts as an optical waveguide confining the light to essentially the lowest order mode with relatively low attenuation. Such hollow dielectric waveguides have been described by Marcatili and Schmeltzer, *Bell System Technical Journal*, 43, 1783 (1964), and Sawatari and Kapany, *Journal of the Optical Society of America*, 60, 132 (1970).

As an example of a possible multistage accelerator design consider a case where $\tau = 9.5 \times 10^{-5}$ sec, the overall length $l = 30$ meters for $v = 6.2 \times 10^7$ cm/sec, which reduces $P/\pi r^2$ by a factor of $4.8 \times 10^2$ to $6.7 \times 10^{10}$ watts/cm$^2$. Let us specify that the power per stage be constant. Also, let the loss per stage be some modest amount like 1.9 db so that the acceleration is essentially constant along the full length. The guide loss $L_g$ (in db) is related to the length $l$ (cm) and guide diameter $w$ (cm) by $L_g$ (db) $= 2.4 \times 10^{-9}/w^3$. Thus, the above criteria specifies that successive stages have different lengths and diameters.

One can show that keeping the overall length constant and doubling the number of stages reduces the total power required by a factor of 1.6, under the assumption of constant acceleration. Since a single stage with $l = 30$ meters requires 2,400 Joules, if we consider 16 stages, this requires a total energy of $2,400/(1.6)^4 = 350$ Joules or 22 Joules/stage. Successive lengths and guide diameters vary from $l_1 = 50$ cm and $w_1 = 288\mu$ to $l_{16} = 300$ cm and $w_{16} = 160\mu$. The total peak pulsed powers and the pulselengths for the various stages vary from $P_1 = 1.8 \times 10^6$ watts and $t_1 = 1.3 \times 10^{-5}$ sec to $P_{16} = 5.5 \times 10^6$ watts and $t_{16} = 4 \times 10^{-6}$ sec. Thus, we arrive at a scheme which is well within the state of present laser art.

Additional improvements in the embodiment of FIGS. 2A and 2B can be made in the same way as suggested above for the embodiment of FIG. 1.

A further interesting possibility would appear to be the recirculation of the light directed away from the particle path at the oblique reflectors in FIGS. 2A and 2B. For example, such light could be synchronized with the next pulse from one of the lasers and the loss of its energy thereby avoided.

The synchronization of the pulsed lasers is not a substantial problem, since it relates primarily only to the overall efficiency of the device. For example, if sufficiently long pulses are used, fairly crude synchronization will be sufficient. If higher efficiencies are needed, the synchronization must be scheduled very presisely to anticipate the time of passage of the particle at a particular point. The electronic synchronization art appears to be adequate for this purpose. Even continuous wave lasers could be employed in place of the pulsed lasers.

In other respects, the embodiment of FIGS. 2A and 2B operates essentially in the same manner as the embodiment of FIG. 1.

Another way to increase the utilization of the light energy that accelerates the particles is to accelerate large numbers of particles simultaneously. Such a modification of the multistage embodiment of FIGS. 2A and 2B is shown in FIGS. 5A and 5B.

Figure 5A:
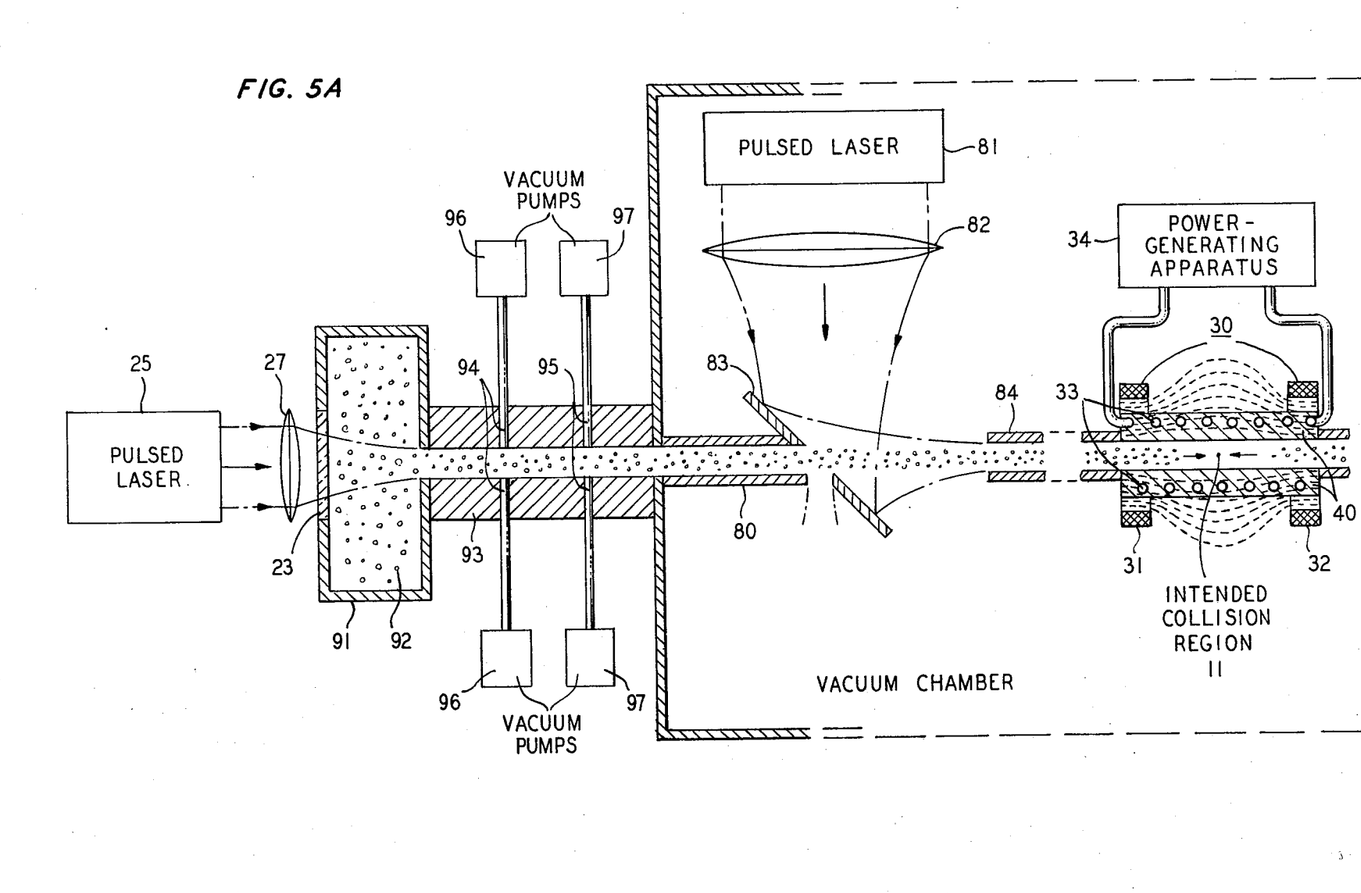
FIGS. 5A and 5B show a preferred embodiment which is a modification of the embodiment of FIGS. 2A and 2B.

In FIGS. 5A and 5D, components numbered the same as in FIGS. 2A and 2B are substantially the same as described before. The embodiment of FIGS. 5A and 5B could employ a large number of accelerating stages, as in the embodiment of FIGS. 2A and 2B, even though only one auxiliary accelerating stage is shown in each half of the apparatus for convenience in drafting.

Figure 5B:
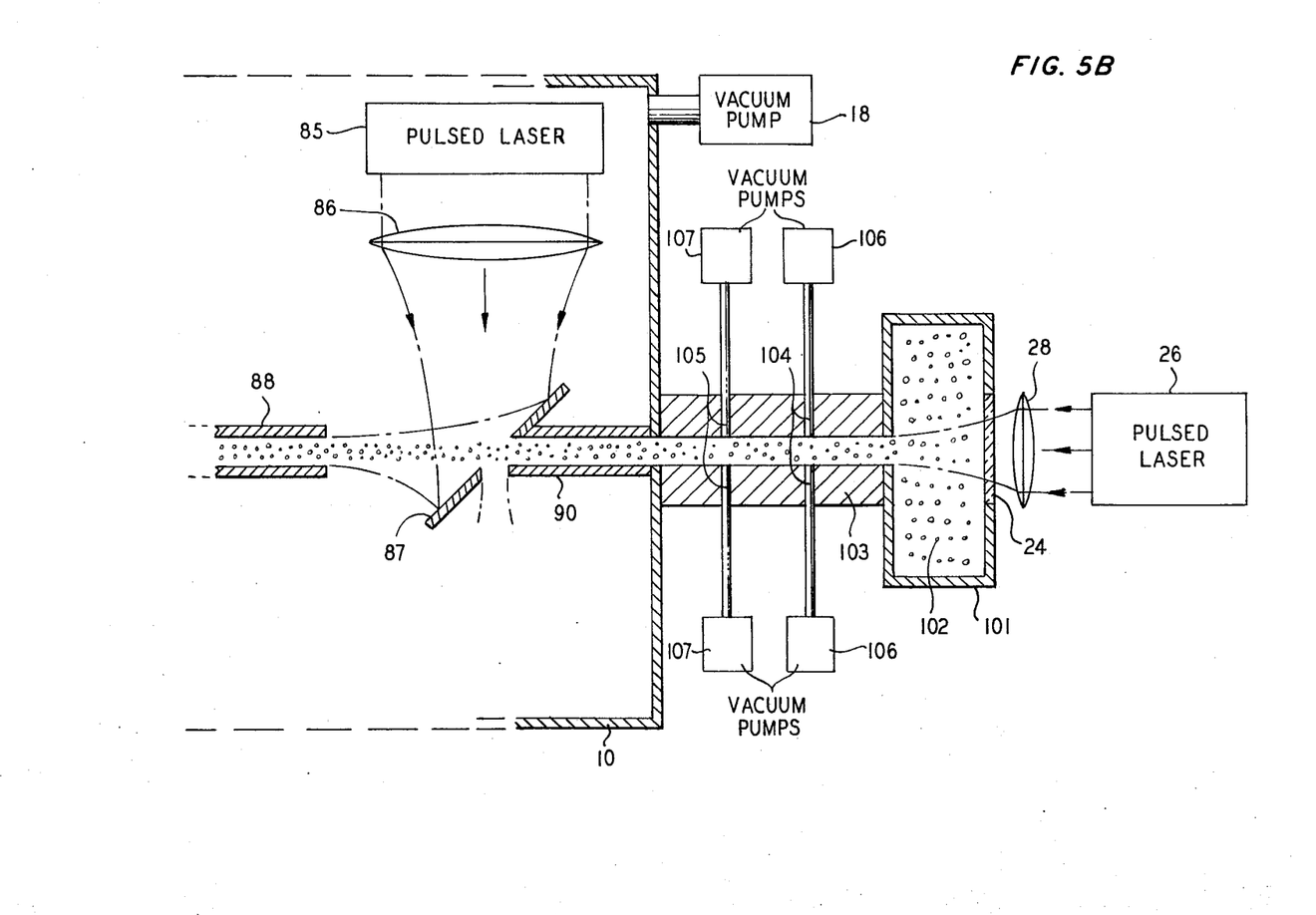
Figure 6:
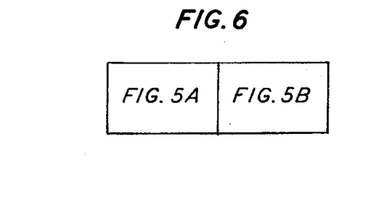
FIG. 6 shows the relationship of FIGS. 5A and 5B.

Nevertheless, with respect to the accelerating stages in the embodiment of FIGS. 5A and 5B, attention is directed to the high degree of focusing of very broad beams from lasers 81 and 85 by lenses 82 and 86, so that oblique reflectors 83 and 87 may have very large apertures for passages of large numbers of accelerated reactant particles. The beams are still broad, but convergent, at reflectors 83 and 87. Attention is also directed to the use of sufficiently long guide sections 84 and 88, otherwise similar to those in FIGS. 2A and 2B, that the laser light has exerted substantially all of its acceleration capability on the large number of particles by the time the particles reach the intended collision region 11. Thus, guides 84 and 88 are shown broken to imply great length sufficient to substantially deplete the laser light. Guides 84 and 88 are spaced from reflectors 83 and 84 by the appropriate distance to be near the waists (minimum diameters) of the highly convergent laser beams.

The respective pluralities of reactant particles 82, 102 to be accelerated are introduced to housings 91 and 101, by means not shown, as atmospheric pressure in a neutral gas, such as helium, and are allowed to flow cut through the bores of the blocks 93 and 103 in the paths of the accelerating beams from lasers 25 and 26.

As the particles 92, 102 are accelerated, the pressure of the neutral gas preferably is tapered gradually to near zero at the outlet of guides sections 80 and 90 in vacuum chamber 10, to reduce its damping effect on the accelerated particles.

The tapered pressure profile is provided by lateral tubes 94, 95, 104, 105 coupled to the respective bores and evacuated by vacuum pumps 96, 97, 106 and 107, as shown. The pressure profile will be determined primarily by the flow capacities and resistances of the tubes 94, 95, 104 and 105, as is well known in the art of fluid mechanics.

The lasers 81 and 88 are similar to lasers 25 and 26, described above except for beamwidth.

In operation, the principal advantage of the embodiment of FIGS. 5A and 5B resides in the more efficient utilization of the accelerating light pulses by large numbers of reactant particles 92, 102. A higher net yield appears feasible.

Various modifications of the invention should be apparent, particularly as applied to slightly modified uses, such as an experimental tool for studying high energy neutral particle collisions or producing micrometeoroid type for use in other experiments. Also, a stationary reactant or non-reactant target could replace or supplement reactant particles 13 or 102 at collision region 11.

It is apparent that other particles of material capable of nuclear fusion could be employed. The principal restriction in such cases is that for each such particle there be sufficiently intense electromagnetic radiation available in a wavelength range in which the particle is sufficiently transparent to avoid melting or vaporization before its intended collision.

What is claimed:

1. Apparatus comprising
    a neutral particle that is substantially transparent at a particular wavelength of optical electromagnetic radiation,
    means for accelerating said particle, including means for supplying another plurality of beams at said particular wavelength to said particle successively to provide cumulative accelerations in the same direction, said supplying means including
    a plurality of reflectors having central apertures aligned along the axis of a first one of said beams and having oblique orientations to receive respective other ones of said beams and direct portions of them along said axis, said particle being initially accelerated by said first beam along said axis to pass through said apertures.

2. Apparatus according to claim 2 in which the accelerating means includes a plurality of hollow guides for said other plurality of beams aligned along said axis and periodically disposed about said reflectors to pass said particle while guiding said other plurality of beams.

3. Apparatus comprising
   means for supplying a plurality of neutral particles in a gaseous atmosphere, said particles being substantially transparent at a particular wavelength of optical electromagnetic radiation, including means for tapering the pressure of said atmosphere gradually and nearly to zero along a linear path.
   first means for accelerating said particles along said path in the direction of decreasing pressure and substantially increasing the magnitudes of their velocities, including
   means including a first laser source of said radiation for supplying to said particles a first beam of said radiation at said wavelength to exert radiation pressure on said particles in a direction coinciding with the direction of said path,
   means for aiding the beam from said first laser source, comprising a second laser source of a second beam of radiation of said wavelength, an oblique reflector having an orientation to direct said second beam in said direction along said path and have an aperture centered on said path, and
   means for guiding said first beam to said aperture.

4. Apparatus according to claim 3 in which the accelerating means includes means along said path after said reflector for guiding the second beam of radiation over a distance sufficient to utilize a major portion of the accelerating capability of said radiation in accelerating said particles.

5. Apparatus according to claim 4 including
   means for supplying a second plurality of neutral particles in a gaseous atmosphere, said particles being substantially transparent at a particular wavelength of optical electromagnetic radiation, including means for tapering the pressure of said atmosphere gradually and nearly to zero along a second linear path aligned with the aforesaid linear path but tapering the pressure in the opposite sense to the tapering in the aforesaid linear path, and
   second means for accelerating said second plurality of particles along said second path, said second accelerating means being substantially similar to said first accelerating means.

* * * * *